United States Patent Office 3,281,435
Patented Oct. 25, 1966

3,281,435
PREPARATION OF ALKYL-SUBSTITUTED
DIPHENOQUINONES
Edward J. McNelis, Wallingford, Pa., assignor to Sun Oil
Company, Philadelphia, Pa., a corporation of New
Jersey
No Drawing. Filed Oct. 23, 1962, Ser. No. 232,564
8 Claims. (Cl. 260—396)

This invention relates to substituted diphenoquinones and more particularly to a method for preparing substituted diphenoquinones having the general formula

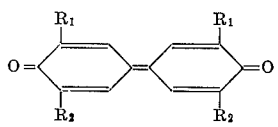

wherein $R_1$ and $R_2$ are alkyl radicals, at least one of which has a branched alkyl chain attached directly to the aromatic nucleus and wherein the sum of the carbon atoms in $R_1$ plus $R_2$ is at least 5 and can range up to about 40.

Diphenoquinones, particularly 3,3′,5,5′-tetra-t-butyldiphenoquinone, are used as antioxidants. Numerous methods for preparing substituted diphenoquinones, particularly 3,3′,5,5′-tetra-t-butyl diphenoquinone have been reported in the literature. This material has been prepared from 2,6-di-t-butyl phenol by reaction in the presence of nitric and acetic acid or in the presence of chromic oxide. In the former method the substituted diphenoquinone was produced only in trace amounts whereas in the latter method, yields less than 50 percent were reported.

A method has now been found whereby substituted diphenoquinones, particularly 3,3′,5,5′-tetra-t-butyl diphenoquinone can be prepared in essentially quantitative yields from a 2,6-dialkyl phenol utilizing activated manganese dioxide.

Briefly the instant invention comprises heating a 2,6-dialkyl phenol such as 2,6-di-t-butyl phenol in the presence of activated manganese dioxide at a temperature ranging between 20° C. and 360° C. for a period of time ranging between 5 minutes and 25 hours, and subsequently recovering the substituted diphenoquinone such as 3,3′,5,5′-tetra-t-butyl diphenoquinone.

"Activated manganese dioxide" is a well known material (see Evans, Quarterly Reviews, 13, pp. 67–70, 1959). It is a form of hydrated manganese dioxide and is generally prepared by reacting manganese sulfate with potassium permanganate in a hot aqueous solution in the presence of sufficient alkali to insure that the reaction mixture remains alkaline after being washed with water. The resulting slurry is dried at 100–120° C. and activated manganese dioxide is recovered. It can also be prepared by reacting manganese sulfate and potassium permanganate in a hot aqueous solution in the absence of any alkali. The resulting aqueous mixture becomes strongly acidic and after drying the slurry at 100–120° C., activated manganese dioxide is recovered. Activated manganese dioxide is also prepared by heating manganese oxalate or manganese carbonate at 250° C. The resulting product can be used as produced or it can be washed with dilute aqueous nitric acid and subsequently dried at 230° C.

In a specific embodiment of this invention, 2,6-di-t-butyl phenyl is heated in the presence of activated manganese dioxide to produce 3,3′,5,5′-tetra-t-butyl diphenoquinone. The use of activated manganese dioxide is critical to the success of this invention since ordinary manganese dioxide is not operable herein. The 2,6-di-t-butyl phenol is preferably heated in the presence of a solvent and in the absence of air. Examples of suitable solvents which may be used include chloroform, benzene, toluene, nitrobenzene, and dimethyl formamide. Chloroform and benzene are the preferred solvents.

The temperature at which the 2,6-di-t-butyl phenol-activated manganese dioxide mixture is heated can vary over a wide range. It has been found that substantial amounts of substituted quinone are produced at a temperature as low as 20° C. If the 2,6-di-t-butyl phenol is not contained in a solvent, the maximum temperature to which the reaction mass can be heated is governed by the decomposition temperature of 2,6-di-t-butylphenol. If, however, the 2,6-di-t-butyl phenol is dissolved in a solvent prior to the addition thereto of the activated manganese dioxide, the maximum temperature to which the reaction mass can be heated is governed by the boiling point of the solvent used at the pressure employed. While temperatures ranging between about 20° C. to as high as 360° C. can be used in this invention, it is preferred that a temperature ranging between about 60° C. and 250° C. be used.

The time that the reaction mixture is heated can vary between 5 minutes and 25 hours. It is preferred that the heating time range between about 0.5 hour and 2 hours.

The molar ratio of activated manganese dioxide to 2,6-di-t-butyl phenol can also vary over wide limits. It has been found that if trace amounts of activated manganese dioxides are present in the reaction mass, there is produced some 3,3′,5,5′-tetra-t-butyl diphenoquinone. It is preferred, however, in order to optimize the yield of substituted quinone, that the molar ratio of activated manganese dioxide to 2,6-di-t-butyl phenol range between about 0.5:1 and 100:1 with a molar ratio ranging between about 3:1 and 10:1 being most preferred.

To recover the desired product, the reaction mass is first separated such as by filtration and the filtrate containing the quinone product is evaporated to dryness.

The following example further illustrates the instant invention.

To 50 ml. of benzene there were added 6.9 g. of 2,6-di-t-butyl phenol and 8.7 g. of activated manganese dioxide. The resulting mixture was heated at reflux temperature for 2 hours under an atmosphere of nitrogen. At the end of the reaction time the mixture was filtered and the precipitate was washed with 300 ml. of benzene. The filtrate containing the quinone product therein was evaporated to dryness and identified as 3,3′,5,5′-tetra-t-butyl diphenoquinone by melting point (observed 244–245° C., reported 245–246° C.) and elemental analysis which showed a carbon content of 82.52%, a hydrogen content of 9.98%, and an oxygen content of 7.88% as compared with values of 82.50%, 9.65%, and 7.85% respectively, calculated for $(C_{14}H_{20}O)_2$. The molecular weight found by mass spectroscopy was 408 as compared with a calculated value of 408. The yield of product was 98% of theory.

When other 2,6-dialkyl phenols as described herein such a 2-methyl-6-t-butyl phenol, 2-ethyl-6-t-butyl phenol and 2-propyl-6-t-butyl are substituted for 2,6-di-t-butyl phenol, substantially similar results are obtained.

I claim:
1. Method for preparing substituted diphenoquinones which comprises heating a 2,6-dialkyl phenol having the general formula

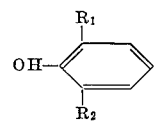

wherein $R_1$ and $R_2$ are alkyl radicals, at least one of which has a branched alkyl chain attached directly to the aromatic nucleus, and wherein the sum of the carbon atoms in $R_1$ plus $R_2$ is at least 5, in the presence of activated manganese dioxide at a temperature ranging between 20° C. and 360° C. for a period of time ranging between 5 minutes and 25 hours and thereafter recovering said quinone product.

2. Method in accordance with claim 1 wherein the temperature ranges between 60° C. and 250° C. for a period of time ranging between 0.5 hour and 2 hours.

3. Method in accordance with claim 1 wherein the molar ratio of activated manganese dioxide to 2,6-di-t-butyl phenol ranges between 0.5:1 to 100:1.

4. Method in accordance with claim 1 wherein the molar ratio of activated manganese dioxide to 2,6-di-t-butyl phenol ranges between 3.0:1.0 and 10.0:1.0.

5. Method for preparing 3,3',5,5'-tetra-t-butyl diphenoquinone which comprises heating 2,6-di-t-butyl phenol in the presence of activated manganese dioxide at a temperature ranging between 20° C. and 360° C. for a period of time ranging between 5 minutes and 25 hours and thereafter recovering said quinone product.

6. Method in accordance with claim 5 wherein the temperature ranges between 60° C. and 250° C. for a period of time ranging between 0.5 hour and 2 hours.

7. Method in accordance with claim 5 wherein the molar ratio of activated manganese dioxide to 2,6-di-t-butyl phenol ranges between 0.5 to 100:1.

8. Method in accordance with claim 5 wherein the molar ratio of activated manganese dioxide to 2,6-di-t-butyl phenol ranges between 3.0:1.0 to 10.0:1.0.

References Cited by the Examiner

UNITED STATES PATENTS

| | | | |
|---|---|---|---|
| 2,686,814 | 8/1954 | Jones | 260—396 X |
| 2,794,051 | 5/1957 | Lipscomb | 260—396 |

LORRAINE A. WEINBERGER, *Primary Examiner.*

L. A. THAXTON, *Assistant Examiner.*